US007069731B2

(12) United States Patent
Hunt

(10) Patent No.: US 7,069,731 B2
(45) Date of Patent: Jul. 4, 2006

(54) COOLING APPARATUS

(75) Inventor: Richard Grant Hunt, Yeovil (GB)

(73) Assignee: Honeywell Normalair-Garrett (Holdings) Limited, Yeovil (GB)

( * ) Notice: Subject to any disclaimer, the term of this patent is extended or adjusted under 35 U.S.C. 154(b) by 243 days.

(21) Appl. No.: 10/433,149

(22) PCT Filed: Nov. 27, 2001

(86) PCT No.: PCT/GB01/05230

§ 371 (c)(1),
(2), (4) Date: Oct. 9, 2003

(87) PCT Pub. No.: WO02/44024

PCT Pub. Date: Jun. 6, 2002

(65) Prior Publication Data

US 2004/0040326 A1    Mar. 4, 2004

(30) Foreign Application Priority Data

Nov. 30, 2000   (GB) .................................. 0029194.8

(51) Int. Cl.
*B60H 1/32* (2006.01)
(52) U.S. Cl. .............................. 62/89; 62/236; 62/239; 62/401; 62/DIG. 5
(58) Field of Classification Search .................. 62/236, 62/237, 89, 239–244, 401–403, DIG. 5
See application file for complete search history.

(56) References Cited

U.S. PATENT DOCUMENTS

| 2,210,896 | A | * | 8/1940 | Brush .......................... 165/41 |
| 2,777,301 | A |   | 1/1957 | Kuhn |
| 2,859,945 | A | * | 11/1958 | Kleist .......................... 165/63 |
| 2,930,205 | A |   | 3/1960 | Walker |
| 3,824,598 | A |   | 7/1974 | Beaussay et al. |
| 4,051,691 | A | * | 10/1977 | Dawkins ....................... 62/236 |
| 4,869,071 | A | * | 9/1989 | Wehner et al. ................. 62/133 |
| 5,086,622 | A | * | 2/1992 | Warner .......................... 62/88 |
| 5,086,625 | A | * | 2/1992 | Momose et al. ............... 62/172 |
| 5,201,182 | A | * | 4/1993 | Grignon et al. ............... 62/3.2 |
| 5,333,678 | A | * | 8/1994 | Mellum et al. ................ 165/42 |
| 5,491,979 | A | * | 2/1996 | Kull et al. ..................... 62/185 |
| 5,899,085 | A | * | 5/1999 | Williams ....................... 62/236 |
| 6,581,394 | B1 | * | 6/2003 | Smolenskiy ................. 62/172 |

* cited by examiner

*Primary Examiner*—William E. Tapolcai
(74) *Attorney, Agent, or Firm*—MacMillan, Sobanski & Todd, LLC

(57) ABSTRACT

Cooling apparatus for use on a vehicle. The apparatus includes a heat exchanger in which heat is removed from a heat load by a coolant, and first and second coolant supplies. The first coolant supply is adapted to receive a first coolant and to supply the first coolant to the heat exchanger. The first coolant is available during normal vehicle operations. The second coolant supply is adapted to receive a second coolant and to supply the second coolant to the heat exchanger. The second coolant is supplied by a fluid supply and is unavailable during normal vehicle operation.

18 Claims, 2 Drawing Sheets

COOLING APPARATUS

CROSS REFERENCE TO RELATED APPLICATION

This application is a national phase based on PCT application No. PCT/GB01/05230 filed Nov. 27, 2001 Priority is claimed to United Kingdom patent application Ser. No. 0029194.8 filed Nov. 30, 2000

DESCRIPTION OF INVENTION

This invention relates to a cooling apparatus, for example for use in an aircraft avionics pod.

An avionics pod is an aerodynamically shaped container which is mounted on the underside of an aircraft, and which typically contains sensitive optical and electronic equipment such as navigation and thermal imaging equipment. The electronic equipment within the pod generates heat, and it is necessary to cool the interior of the pod, to ensure optimum performance of the optical and electronic equipment.

It is known to cool the pod using "ram air", i.e. using air pressurised by the forward speed of the aircraft. Where the ram air is sufficiently cold, for example, if the aircraft is flying at a high altitude, the ram air is typically directed into a heat exchanger, which cools a coolant fluid for the electronic equipment. Where the ambient air temperature is not sufficiently low, or where additional cooling is required, it is known to direct the ram air into a turbine where the air is expanded, and hence its temperature reduced, before directing the cooled ram air into the heat exchanger.

One such prior art arrangement is disclosed in U.S. Pat. No. 4,869,071.

Adequate cooling using ram air alone may not be achieved if the aircraft is not in flight, or the engines are not running. In order to provide adequate cooling under these conditions, it is known to provide an electrically powered fan to draw ambient air into the pod, in order to cool the pod. This requires an additional electrical power source and control system, which in turn generates more heat.

According to a first aspect of the invention, we provide a cooling apparatus for use on a vehicle, the cooling apparatus including a heat exchanger in which heat is removed from a heat load by a coolant, characterised in that the cooling apparatus also includes a first and second coolant supply means, the first coolant supply means being adapted to receive a first coolant and supply the first coolant to the heat exchanger, the first coolant being available during normal vehicle operation, and the second coolant supply means being adapted to receive a second coolant and supply the second coolant to the heat exchanger, the second coolant being supplied by a fluid supply means, which is unavailable during normal vehicle operation.

Preferably, the cooling apparatus is adapted to cool an aircraft avionics pod.

Thus, by virtue of such a cooling apparatus, a vehicle, or part of a vehicle, such as an avionics pod, may be cooled while the vehicle is stationary, or while the vehicle engine(s) is/are not running, without the need for e.g. an electrically powered fan. This eliminates the need for a further electrical power supply and control means, and reduces the cost and complexity of the cooling system.

Preferably the first coolant is air from the exterior of the vehicle which has been pressurised as a result of normal vehicle operation.

Preferably the second coolant is supplied by a fluid supply means at a base to which the vehicle returns, for example where the vehicle is an aircraft, a fluid supply means based on an aircraft carrier. The second coolant may be compressed air, which may be supplied from an air aircraft carrier compressor unit. Alternatively, the fluid supply means may be a mobile air compressor.

A first cooling means may be provided to cool the first coolant before it enters the heat exchanger. A second cooling means may also be provided to cool the second coolant before it enters the heat exchanger.

Preferably the first and second cooling means each include an expansion means which permits the first and second coolant to expand. The expansion means may include an expansion turbine. The second cooling means may also include a fan which is driven by rotation of the turbine of the second cooling means, and which is adapted to assist in drawing coolant through the heat exchanger.

An exhaust vent may be provided in the heat exchanger to permit flow of exhausted coolant out of the heat exchanger, and the exhaust vent may be closed using a valve, the valve being adapted to open the exhaust vent when the coolant pressure inside the heat exchanger exceeds the pressure at the exterior of the heat exchanger by a predetermined amount.

Furthermore, where the invention is applied to an avionics pod, a pod exhaust vent is preferably provided in a wall of the pod to permit flow of exhausted coolant out of the pod, the pod exhaust vent being located close to the fan and being closable by a valve which is adapted to open when the pressure in the interior of the pod exceeds the pressure at the exterior of the pod by a predetermined amount.

According to a second aspect of the invention, we provide a method of cooling a heat load in a vehicle using a cooling apparatus, the cooling apparatus including a heat exchanger in which heat is removed from a heat load by a coolant, characterised in that the method includes the steps of using a first coolant supply means to supply a first coolant to the heat exchanger when the vehicle is in normal operation, and using a second coolant supply means to supply a second coolant to the heat exchanger when the vehicle is at rest and the first coolant is unavailable or is unable to provide adequate cooling.

Preferably the method also includes the step of connecting a fluid supply means to the second coolant supply means, when the vehicle is at rest, such that the fluid supply means may supply the second coolant to the heat exchanger.

The invention will now be described with reference to the accompanying drawings in which.

Figure 1:
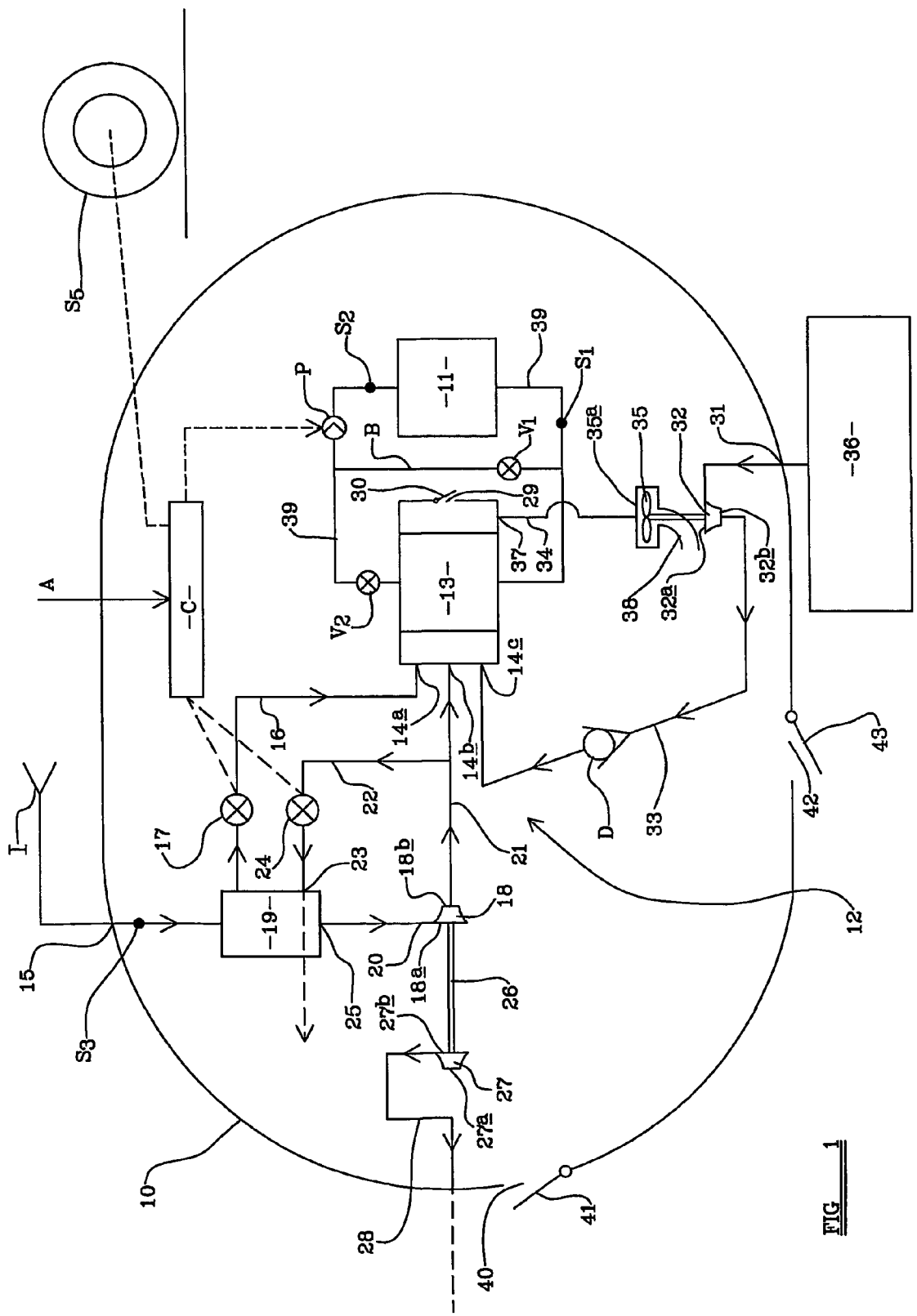
FIG. 1 is a diagrammatic illustration of a cooling system according to the invention.

Referring now to the FIG. 1, there is represented an avionics pod 10, which is a container containing optical and electronic equipment 11. The electronic equipment 11, in use, generates heat, thus providing a heat load 11 which must be cooled to ensure optimum operation of the electronic equipment. The avionics pod 10 is typically mounted on the underside of an aircraft 1.

The heat load 11 is cooled using a cooling apparatus 12, which includes a first heat exchanger 13, and three inlet means 14a, 14b, 14c whereby coolant is supplied to the first heat exchanger 13. The coolant supplied to the first heat exchanger 13 cools a further coolant, a load coolant, which is contained within a closed duct circuit 39 and the load coolant may be pumped around the closed duct circuit 39 by one or more pumps P. The load coolant circulates through the first heat exchanger 13 and around the heat load 11, and may be a liquid or a gas.

The first heat exchanger 13 includes an exhaust vent 29, which permits the flow of exhausted coolant out of the first heat exchanger 13, and which is closable by a heat exchanger exhaust valve 30. The heat exchanger exhaust valve 30 may be a clam type flap valve, in which a closure member is resiliently biased to close the exhaust vent 29. When the pressure exerted on the closure member from inside the first heat exchanger 13 reaches a predetermined value above the pressure outside the first heat exchanger 13, the closure member moves to an open position, which permits coolant to pass from the heat exchanger 13 to the interior of the pod 10 through the exhaust vent 29.

A first inlet means 15 is provided in a wall of the pod 10 to collect ram air during forward flight, and is connected to a ram air inlet 14a of the first heat exchanger 13, by means of a duct 16 in which a ram air supply valve 17 is located. The ram air supply valve may for example be a butterfly valve. The first inlet means 15 includes an aperture extending through a wall of the pod 10 and is adapted to receive the first coolant, ram air, from the exterior of the pod 10, from an inlet I, and direct it via the duct 16 into the first heat exchanger 13.

The first inlet means 15 is also connected to a second heat exchanger 19, such that if the ram air supply valve 17 is closed or partially closed, all or a portion of the ram air will pass through the second heat exchanger 19. The second heat exchanger 19 has a coolant inlet 23, and a coolant vent 25, which are connected via a closed coolant pathway within the heat exchanger 19, thus permitting heat transfer between coolant entering through the coolant inlet 23 and ram air entering from the first inlet means 15.

An outlet duct 20 is provided from the second heat exchanger 19, which directs ram air passing into the second heat exchanger 19 onto a first expansion turbine 18. The first expansion turbine 18 is connected on its outlet side 18b to a cooled ram air inlet means 14b of the first heat exchanger 13 via a duct 21. The duct 21 has a branch 22 which connects the duct 21 to the coolant inlet 23 of the second heat exchanger 19. The branch 22 contains a ram air cooling valve 24, and opening of the valve 24 permits flow of air from the duct 21 back into the second heat exchanger 19. The ram air cooling valve 24 may if desired, be a butterfly valve.

Operation of the ram air supply valve 17 and the ram air cooling valve 24 is controlled by an electronic control means C as will be described in more detail below.

There is a compressor 27 which is mounted on a common drive shaft 26 with the first expansion turbine 18, such that rotation of the first expansion turbine 18 causes rotation of the compressor 27. The compressor 27 has an inlet side 27a, which draws fluid from the interior of the pod 10, and an outlet side 27b, which is connected to the exterior of the pod 10 via an exhaust duct 28.

A first pod exhaust vent 40, through which exhaust gases may flow out of the interior of the pod, is positioned in a wall of the pod 10, close to the compressor 27, and at a rear end of the pod 10. The first pod exhaust vent 40 is closed by a first exhaust valve 41, the first exhaust valve 41 being a clam type flap valve, in which a closure member, is resiliently biased to close the first pod exhaust vent 40. When the pressure within the pod 10 exceeds the pressure outside the pod 10 by a predetermined amount, the first exhaust valve 41 opens, thus permitting flow of gas from the interior to the exterior of the pod 10.

A second inlet means 31 is provided in the wall of the pod 10, the second inlet means 31 including an aperture in the wall of the pod 10, and connection means to connect the second inlet means 31 to a fluid supply means 36, thus permitting the second inlet means 31 to receive the second coolant from the fluid supply means 36.

The fluid supply means 36 is ground based, and is available only when the aircraft is stationary. The second coolant is compressed air, and the fluid supply means 36 is for example a mobile air compressor or a high pressure air supply line from a compressor, such as may be provided on an aircraft carrier.

There is a second expansion turbine 32 positioned such that the compressed air entering the second inlet means 31 is directed into an inlet side 32a of the second expansion turbine 32. An outlet side 32b of the second expansion turbine 32 is connected via a duct 33 to a compressed air inlet means 14c of the first heat exchanger 13 so that expanded second coolant may be fed to the inlet 14b of the heat exchanger 13. A non-return valve D is located in the duct 33 in order to prevent backflow of second coolant from the first heat exchanger 13 to the second inlet means 31.

There is a fan 35 mounted on a common drive shaft with the second expansion turbine 32, such that rotation of the second expansion turbine 32 causes rotation of the fan 35. An inlet side 35a of the fan 35 is connected to a compressed air outlet means 37 of the first heat exchanger 13, through which coolant may flow out of the first heat exchanger, via a duct 34. An outlet side 35b of the fan 35 is connected to a fan vent 38 which expels fluid from the fan 35 into the interior of the pod 10. A second pod exhaust vent 42, closed with a second exhaust valve 43, is located in a wall of the pod 10 close to the fan 35, and is constructed and functions in an identical fashion to the first pod exhaust vent 40 and first exhaust valve 41.

The pod exhaust vents 40, 42 are positioned in the wall of the pod 10 so as to avoid the exhausted gases burning or causing discomfort to ground staff, and to reduce the likelihood of hot exhaust air being drawn back into and recirculated within the pod 10.

When the vehicle is in normal use, e.g. flying in the case of an aircraft 1, the fluid supply means 36 will be disconnected.

If the ram air at the first inlet means 15 is sufficiently cool, for example if the aircraft is flying at high altitude, the cooling system 12 may be used in "ram air mode", in which the ram air supply valve 17 is in the open position. Ram air, which is at a relatively high pressure, flows through the first inlet means 15 and into the first heat exchanger 13, and cools the load coolant. Circulation of the load coolant thus cools the heat load 11.

The flow of ram air increases the pressure within the first heat exchanger 13, until the heat exchanger exhaust valve 30 opens and permits the ram air to flow out of the heat exchanger 13 through the exhaust vent 29 and into the interior of the pod 10. The pressure increases in the interior of the pod 10, until the first 41 and/or second 43 exhaust valves open and permit the exhaust gas to flow out of the pod 10 through the first 40 and/or second 42 pod exhaust vent.

If the aircraft 1 is flying at a lower altitude, at which the ram air temperature is not sufficiently low to provide adequate cooling, or if the heat load is particularly high, such that ram air alone cannot provide adequate cooling, the cooling system 12 may be used in "air cycle cooling mode", in which the ram air supply valve 17 is closed or at least partially closed.

If the ram air supply valve 17 is closed, the ram air is constrained to flow through the second heat exchanger 19, and onto the first expansion turbine 18. The air flow onto the first expansion turbine 18 causes it to rotate. The first expansion turbine 18 permits the ram air to expand, and thus the temperature of the ram air decreases. If the valve 24 in the branch 22 is closed, all the cooled ram air flows along the duct 21 into the first heat exchanger 13, and cools the load coolant, which in turn cools the heat load 11.

As when operated in ram air mode, the flow of ram air increases the pressure within the first heat exchanger 13, until the heat exchanger exhaust valve 30 opens and permits the ram air to flow out of the heat exchanger 13 through the exhaust vent 29 and into the interior of the pod 10. In air cycle cooling mode, however, the pressure of the ram air has been reduced by the first turbine 18, and may not be high enough to drive the air efficiently through the interior of the pod 10 and out of the pod exhaust vents 40 or 42.

Rotation of the first expansion turbine 18 causes rotation of the compressor 27, and the compressor 27 compresses air from the interior of the pod 10, which enters the inlet side 27a of the compressor 27. This causes a reduction in pressure within the pod 10, and both first 41 and second 43 exhaust valves close and to seal the pod exhaust vents 40 and 42. Air passes through the compressor 27, and flows along the exhaust duct 28, and is ejected from the pod 10.

If the ram air supply valve 17 is only partially closed, some of the ram air flows into the second heat exchanger 19, and is cooled by the first expansion turbine 27, before entering the first heat exchanger 13, and some of the ram air flows directly into the first heat exchanger 13. The extent to which the ram air supply valve 17 is open is controlled by the control means C and is optimised according to conditions such as heat load temperature, aircraft altitude, and mach number.

In order to control the temperature and pressure of the cooled ram air passing into the first heat exchanger 13 from the first expansion turbine 18, the ram air cooling valve 24 in the side duct 22 may be opened. In this case, some of the air from the first expansion turbine 18 flowing along duct 21 flows along the branch 22, through the coolant inlet 23 and into the second heat exchanger 19.

This cooled ram air flows along the closed coolant pathway within the second heat exchanger 19, cools the ram air within the second heat exchanger 19, and flows out through the coolant vent 25 into the interior of the pod 10.

Figure 2:
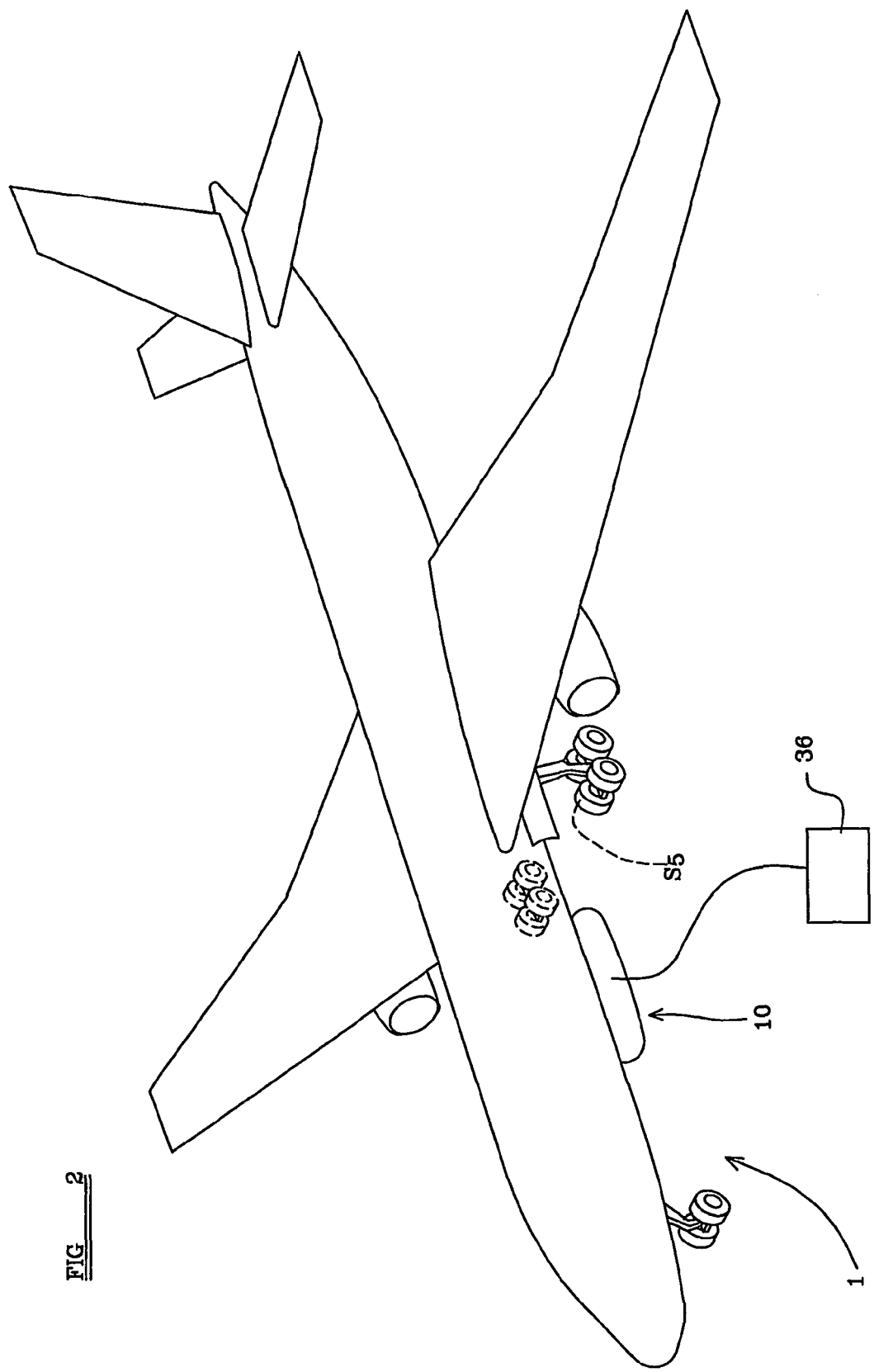
FIG. 2 is a diagrammatic illustration of an aircraft with a cooling system in accordance with the invention.

When the aircraft 1 is not in flight, e.g. is at rest at a base to which the aircraft has returned as indicated in FIG. 2, adequate cooling cannot be provided using ram air alone, even if the "air cycle cooling mode" is employed, for example if the aircraft speed is too low to provide sufficient ram air pressure for effective cooling. Thus the cooling system 12 may be used in "ground cooling mode".

In ground cooling mode, the ram air supply valve 17 is opened, so that any air entrained into the first inlet means 15 passes into the first heat exchanger 13.

A fluid supply means 36, such as a mobile air compressor or a high pressure air supply, is connected to the second inlet means 31. Compressed air flows into the second inlet means 31, and enters the inlet side 32a of the second expansion turbine 32. Compressed air impinging on the second expansion turbine 32 causes it to rotate, which permits the air fed to the second expansion turbine 32 to expand. Thus the temperature of the compressed air is reduced.

Rotation of the second expansion turbine 32 also causes the fan 35 to rotate, and to draw air out of the first heat exchanger 13 through duct 34, reducing the pressure within the heat exchanger 13. This reduction in pressure causes the heat exchanger exhaust valve 30 to close, and therefore prevents gas from passing through the exhaust vent 29, and draws cooled compressed air into the heat exchanger 13 from the second turbine wheel outlet 32b via duct 33.

The cooled compressed air entering the first heat exchanger 13 cools the load coolant and circulation of the load coolant cools the heat load 11. Thus the heat load within the pod 10 may be cooled when the aircraft is stationary, and when the engines are not running or the engine speed is low, without the use of an electric fan.

The exhaust air drawn out of the first heat exchanger 13 by the fan 35 is expelled through the fan vent 38 into the interior of the pod 10. Pressure builds up inside the pod 10, particularly in the region around the fan vent 38, which causes the second valve 43 to open, and exhausted coolant to flow out of the pod 10 through the second pod exhaust vent 42.

The embodiment described above is by way of example only, and various modifications may be made without affecting the scope of the invention.

For example, the invention is not restricted to use in an avionics pod 10. It may, for example, be used to cool electronic equipment or any other heat load, on or in the interior of an aircraft 1. Moreover, the invention is not restricted for use in an aircraft 1. It may be used on any vehicle where cooling is required, and where a supply of coolant is available during normal operation of the vehicle.

It may not necessary to provide expansion turbines to provide extra cooling means for the incoming coolant. Either or both the first and second supply means may supply ram air or compressed air respectively, directly to the first heat exchanger 13. Similarly, it may not be necessary to provide a second heat exchanger 19.

The fluid supplied by the fluid supply means 36 need not be compressed air. It could be any other gas. The load coolant in the closed circuit 39 may be gas or liquid as desired.

An electric fan may be provided in addition to the cooling system 12, to provide a back-up for use when ground air cooling is required, but where no fluid supply means 36 is available.

If desired, to provide for fine control over the cooling achieved within the pod 10, the control means C may be provided with various inputs and provide control outputs according to an algorithm.

For example, if desired, temperature sensors may be provided, such as indicated at S1 to sense the temperature of the load coolant in the load coolant loop 39 prior to the load coolant cooling the load 11; at S2 for sensing the temperature of the load coolant subsequent to use in cooling the load 11; S3 to sense the temperature of the ram air entering the cooling system 12. Each of these temperature sensors S1–S3, and any other temperature sensors to sense e.g. the temperature of the first coolant supplied at each of inlets 14a, 14b, 14c to the first heat exchanger 13, may provide respective inputs to the control means C.

Additionally, inputs A relating to aircraft operating conditions may provide inputs to the control means C, e.g. relating to operating conditions such as Mach number and altitude, which data may readily be obtained from the aircraft's 1 own systems.

In response, the control means C may provide appropriate outputs to the pump P in the load coolant loop 39, and to the ram air supply valve 17 and the ram air cooling valve 24.

If desired, there may be provided a by-pass loop B in the load coolant loop to enable load coolant to by-pass the first heat exchanger 13, e.g. when heating rather than cooling of the load 11 may be required, to maintain the temperature within the pod within given parameters. Thus the control means C may provide control inputs to one or more valves V1, V2 in the load coolant loop 39, so that the proportion of load coolant allowed to by-pass the load 11 may be varied.

If desired there may be provided a weight-on-wheels sensor S5 to sense when the aircraft has landed, which sensor may provide an input to the control means C so that for example assisted cooling of the ram air using the first expansion turbine 18 may be brought into operation upon landing, in anticipation of the supply of cooling ram air becoming inadequate. Of course, when a fluid supply means 36 is connected to the pod 10, this too may be sensed to provide an input to the control means C, or if no fluid supply means 36 is available, the weight-on-wheels sensor, or a manual input to the control means C may initiate operation of an electrically operated fan to provide on-ground cooling.

In FIG. 1 the control means C is shown mounted within the pod end. In another arrangement, the control means C could be mounted externally of the pod 10 for example within the aircraft infrastructure. In that event, control lines would be required between the control means and the pod to convey input/output signals.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A cooling apparatus for use on a vehicle, the cooling apparatus including a heat exchanger in which heat is removed from a heat load by a coolant, wherein the cooling apparatus also includes a first and second coolant supply means, wherein the first coolant supply means is adapted to receive a first coolant and to supply the first coolant to the heat exchanger, wherein the first coolant is available during normal vehicle operation, wherein the second coolant supply means is a source of compressed air which supplies said compressed air coolant to the heat exchanger, and wherein the second compressed air source coolant is unavailable during normal vehicle operation.

2. A cooling apparatus as claimed in claim 1 which is adapted to cool an aircraft avionics pod.

3. A cooling apparatus as claimed in claim 1 wherein the first coolant is air from the exterior of the vehicle which has been pressurized as a result of normal vehicle operation.

4. A cooling apparatus as claimed in claim 1 wherein the second coolant is supplied by a fluid supply means at a base to which the vehicle returns.

5. A cooling apparatus as claimed in claim 4 wherein the vehicle is an aircraft, and the fluid supply means is based on an aircraft carrier.

6. A cooling apparatus as claimed in claim 5 wherein the second coolant is supplied from an air aircraft carrier compressor unit.

7. A cooling apparatus as claimed in claim 1 wherein the fluid supply means is a mobile air compressor.

8. A cooling apparatus as claimed in claim 1 wherein a first cooling means is provided to cool the first coolant before it enters the heat exchanger.

9. A cooling apparatus as claimed in claim 1 wherein a second cooling means is provided to cool the second coolant before it enters the heat exchanger.

10. A cooling apparatus as claimed in claim 8 wherein the first cooling means includes an expansion means which permits the first coolant to expand.

11. A cooling apparatus as claimed in claim 9 wherein the second cooling means includes an expansion means which permits the second coolant to expand.

12. A cooling apparatus as claimed in claim 11 wherein the expansion means includes an expansion turbine.

13. A cooling apparatus as claimed in claim 10 wherein the expansion means includes an expansion turbine.

14. A cooling apparatus as claimed in claim 12 wherein the second cooling means includes a fan which is driven by rotation of the expansion turbine of the second cooling means, and which is adapted to assist in drawing coolant through the heat exchanger.

15. A cooling apparatus as claimed in claim 1 wherein an exhaust vent is provided in the heat exchanger to permit flow of exhausted coolant out of the heat exchanger, and the exhaust vent is closed using a valve, the valve being adapted to open the exhaust vent when the coolant pressure inside the heat exchanger exceeds the pressure at the exterior of the heat exchanger by a predetermined amount.

16. A cooling apparatus as claimed in claim 15 wherein the cooling apparatus is adapted to cool an aircraft avionics pod, and a pod exhaust vent is provided in a wall of the pod to permit flow of exhausted coolant out of the pod, the pod exhaust vent being located close to the fan and being closable by a valve which is adapted to open when the pressure in the interior of the pod exceeds the pressure at the exterior of the pod by a predetermined amount.

17. A method of cooling a heat load in a vehicle using a cooling apparatus, the cooling apparatus including a heat exchanger in which heat is removed from a heat load by a coolant, wherein the method includes the steps of using a first coolant supply means to supply a first coolant to the heat exchanger when the vehicle is in normal operation not at rest, and using a second coolant supply means to supply a compressed air second coolant to the heat exchanger when the vehicle is at rest and the first coolant is unavailable or is unable to provide adequate cooling.

18. A method as claimed in claim 17 wherein the method includes the step of connecting a fluid supply means to the second coolant supply means, when the vehicle is at rest, such that the fluid supply means may supply the second coolant to the heat exchanger.

* * * * *